Aug. 20, 1946.　　G. GRISWOLD ET AL　　2,406,073
FORCE AND MOTION TRANSMITTING MECHANISM
Filed Feb. 1, 1944　　2 Sheets-Sheet 1
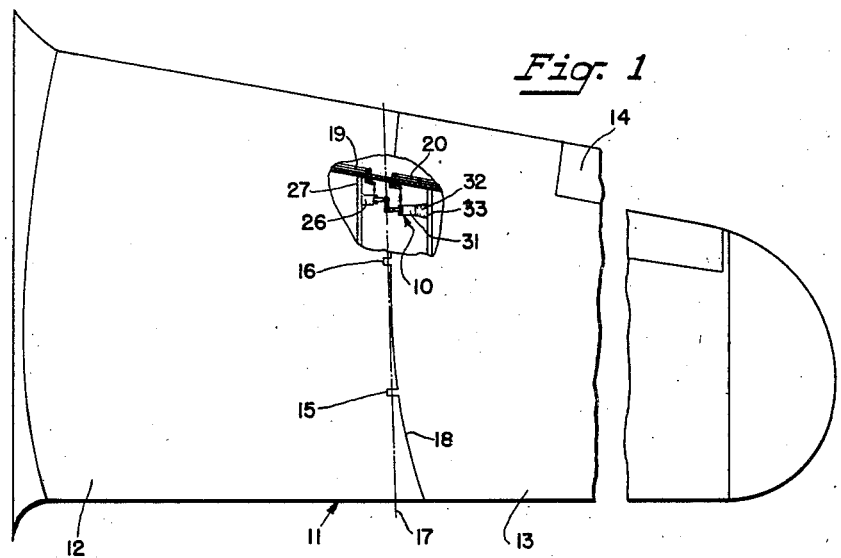
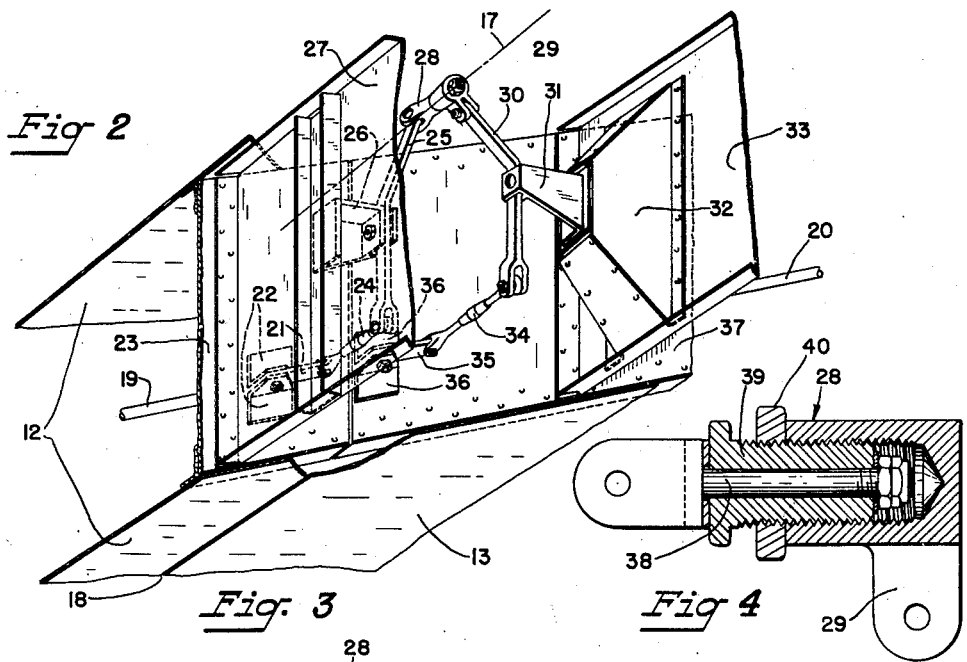
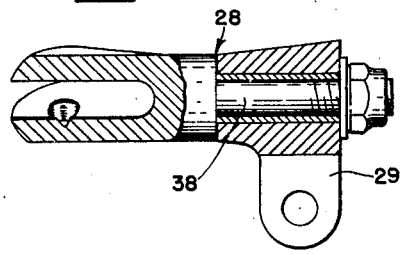
INVENTOR.
GALE GRISWOLD
CHARLES H. CANNON JR.
BY
ATTORNEY Aug. 20, 1946.  G. GRISWOLD ET AL  2,406,073
FORCE AND MOTION TRANSMITTING MECHANISM
Filed Feb. 1, 1944  2 Sheets-Sheet 2

INVENTOR.
GALE GRISWOLD
CHARLES H. CANNON JR.
BY
ATTORNEY

Patented Aug. 20, 1946

2,406,073

UNITED STATES PATENT OFFICE 2,406,073

FORCE AND MOTION TRANSMITTING MECHANISM

Gale Griswold and Charles H. Cannon, Jr., Columbus, Ohio, assignors to Curtiss-Wright Corporation, a corporation of Delaware Application February 1, 1944, Serial No. 520,702

10 Claims. (Cl. 244—49)

This invention relates to force and motion transmitting mechanisms and more particularly is concerned with, although not necessarily limited to, a mechanism for transmitting the movement of the control stick of an airplane of the folding wing type to the aileron or other auxiliary airfoils associated with those sections of the wing which may be folded and extended as circumstances require.

One object of the invention is to provide a mechanism which will permit folding of the wing of the airplane with which it is associated in any position of adjustment of the auxiliary airfoils carried by the movable wing sections, thereby avoiding the necessity of special adjustments to the airfoils prior to the folding of the wing, and hence eliminating any possibility of damage to the mechanism by reason of a failure to make such adjustments.

A further object is to provide a mechanism which is readily adaptable to various types and designs of airfoils.

A still further object is a mechanism wherein provision is made for maintaining a solid connection at all times between the control stick and the auxiliary airfoils whether the wing be folded or extended, this object contemplating a mechanism wherein the use of flexible control cables is eliminated and wherein adjustments may be made with facility to compensate for variations in the dimensions of the parts of the mechanism.

A still further object is to provide a mechanism which is simple in design, dependable in operation and wherein play or lost motion between the parts is reduced to a minimum.

The invention is illustrated in the accompanying drawings, in which:

Figure 1 is a top plan view of a portion of an airplane wing in which the features of the invention are incorporated.

Figure 2 is an enlarged fragmentary perspective view from the under side of the wing at the juncture of the fixed center section and the outer movable section and illustrates the relative positions of the parts of the mechanism when the movable section occupies its extended position.

Figure 3 is a detail view, partially in section and partially in elevation, of the swivel of the mechanism.

Figure 4 is a generally similar view of a modified form of swivel.

Figure 5:
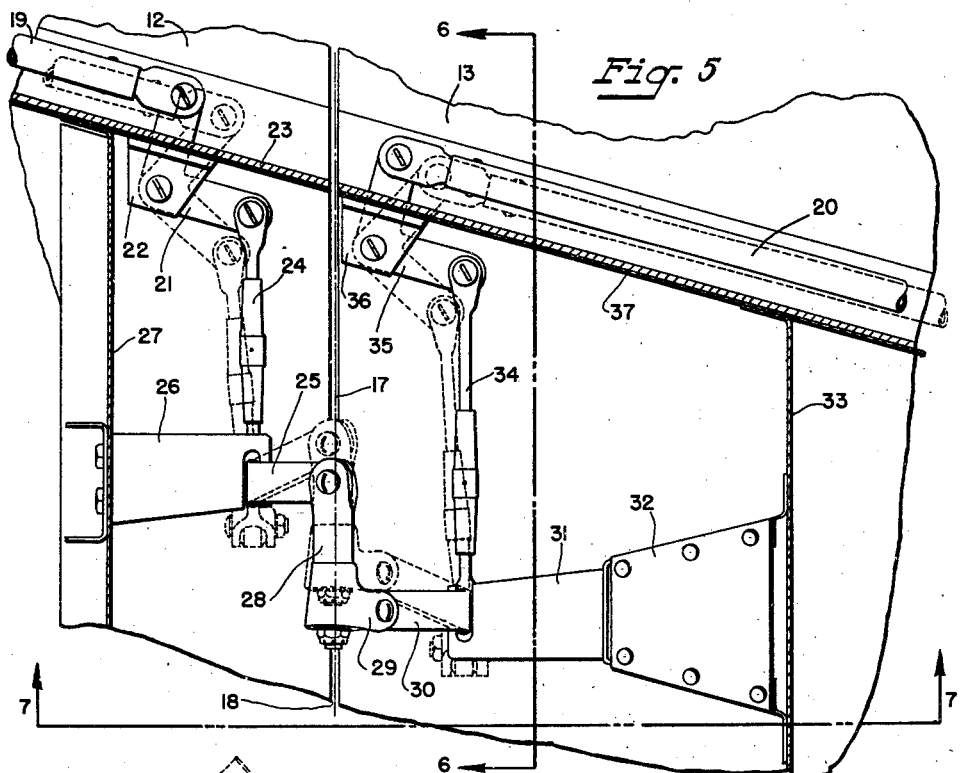
Figure 5 is an enlarged fragmentary view in plan of that portion of the control mechanism which is indicated generally within the area in Figure 1 in which the skin surface of the wing has been removed.
Figure 7:
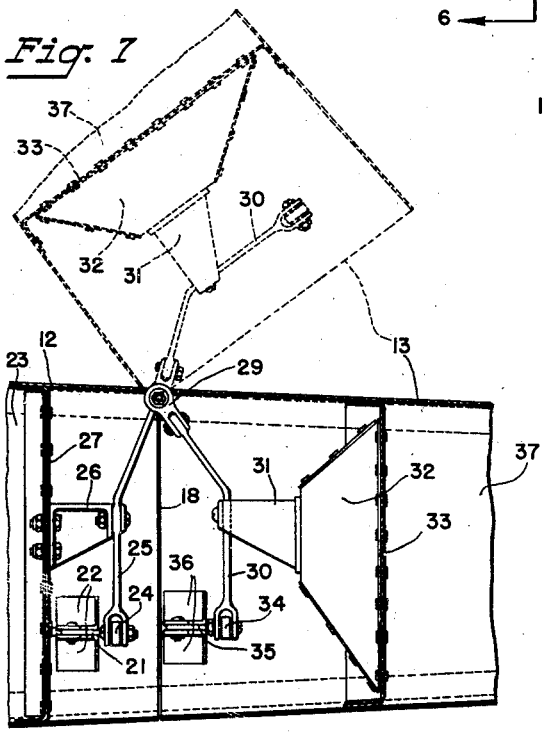
Figure 7 is a fragmentary spanwise section taken along line 7—7 of Figure 5.

The mechanism, indicated generally at 10 in Figure 1, is illustrated in connection with an airplane which is sufficiently indicated for the purpose in view by a showing of the portside of a wing 11 of cantilever design. The center section of the wing, the section to which the fuselage is attached, is indicated at 12 and an outer section at 13, the latter carrying the usual aileron 14. Hinges, the locations of which are indicated at 15 and 16, connect the outer wing section to the center section so that it may be pivoted upwardly about a hinge axis 17 to a folded position, the joint between the center and outer wing sections being indicated at 18.

As is customary, the movements of the aileron are effected by the control stick of the airplane, the movements of the control stick being transmitted to the mechanism 10 by a push-pull tube 19 (Figure 5) and by the said mechanism to the aileron by a push-pull tube 20, it being understood, of course, that the tubes 19 and 20 may, in accordance with conventional practice, be connected to the control stick and aileron, respectively, by any suitable number of similar, serially connected tubes or rods.

In accordance with the invention the outer end of the tube 19 is pivotally connected to the outer end of one arm of a bellcrank 21 (Figure 5) which is mounted by brackets 22 upon a longitudinally extending structural member 23 of the wing section 12. The outer end of the other arm of the bellcrank 21 is connected by a link 24 to one end of a lever 25. The latter is pivotally mounted intermediate its ends upon a bracket 26 which is carried by a transverse structural member 27 and, at its opposite end is pivotally connected to one end of a swivel 28. The opposite end of the said swivel is formed, or provided, with a lateral extension 29 to which one end of a lever 30 is pivotally connected. The lever 30 is pivotally connected intermediate its ends to a bracket 31, the latter being mounted by a spacer 32 upon a transverse structural member 33. The other end of the lever 30 is connected by a link 34 to the outer end of one arm of a bellcrank 35 which is mounted by brackets 36 upon a structural member 37 of the wing section 13, the outer end of the other arm of the bellcrank 35 being connected to the inner end of the tube 20.

It will be noted, referring to Figure 5, that the tubes 19 and 20 are aligned and that longitudinal movement of the former in an outboard direction rocks the bellcrank 21 in a clockwise direction, this movement of the tube 19 being transmitted by the said bellcrank and the link 24 to the lever 25. The resultant angular movement of the latter moves the swivel 28 in an aft direction to thereby rock the lever 30 in the same direction as the lever 25 to cause the bellcrank 35 also to rock in a clockwise direction. When the tube 19 is moved in an inboard direction the bellcranks, links, levers and swivel cause the rod 20 to move in an inboard direction. In other words any movement of the tube 19 is transmitted to the tube 20 so that the latter moves in the same direction and to substantially the same degree as the former.

Figure 6:
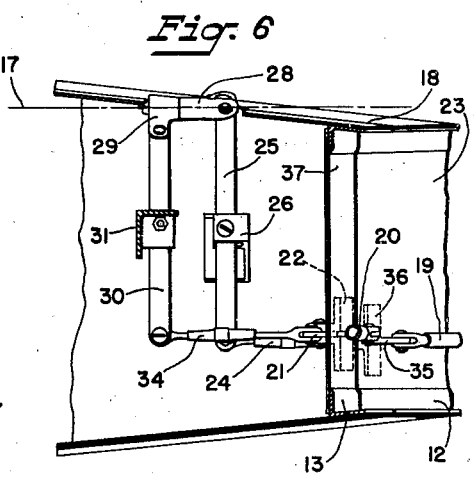
Figure 6 is a fragmentary transverse section taken along line 6—6 of Figure 5.

The mechanism 10 is so designed that the axis of the swivel is substantially coincident with the hinge axis 17, the said swivel, as best shown in Figure 6, forming one side of a parallelogram, the two levers 25 and 30 forming two of the other sides of the parallelogram while the fourth side is formed by the link 24. The lever 25 is mounted inboard with respect to the hinge axis 17 while the lever 30 is mounted in outboard relation with respect to the said axis. Upwardly of their pivotal connections with the brackets 26 and 31, however, the said levers extend angularly in the direction of the hinge axis, the axis of the pivotal connection of the lever 25 with the swivel 28 intersecting the hinge axis and in turn being intersected by the axis of the swivel. The pivotal connection of the lever 30 with the swivel is, on the other hand, located in outboard relation with respect to the hinge axis.

When the tube 19 is actuated to elevate or lower the aileron 14, the resultant movement of the bellcrank, link and lever assembly carried by the wing section 12 is transmitted to the similar assembly carried by the wing section 13 through the agency of the swivel 28, the latter being caused to move axially along the hinge axis 16. As this occurs, there will, of course, be a slight lateral displacement of the swivel with respect to the hinge axis as a result of the arcuate paths traversed by the ends of the levers 25 and 30.

Referring to Figures 3 and 5, it will be noted that the end of the swivel to which the lever 25 is connected is formed with a shank 38 which is journaled for turning movement in the part of the swivel which carries the lateral extension 29. This is to the end that when the outer wing section is folded upwardly to a retracted position, or lowered from such position to an extended position, one part of the swivel may turn with respect to the other; and as the swivel always occupies a position in which its axis is substantially coincident with the hinge axis 17 regardless of the position in which it may be held by the control lever, the elevating and lowering movements of the outer wing section may be effected without regard to the position occupied by the aileron, and hence without the necessity of first adjusting the aileron, or associated parts to any particular predetermined positions. In the event that the axis of the swivel 28 is, for the reason noted, offset slightly with respect to the hinge axis when the wing section 13 is folded, the end of the swivel to which the lever 30 is connected will swing slightly about the connection between the lever 25 and the opposite end of the swivel. Such movements of the swivel, however, are small in magnitude with relation to the axial movements and do not impair or prevent functioning of the mechanism in the manner desired.

The links 24 and 34 may, as illustrated, be in the form of turnbuckles in order to enable their length to be adjusted as may be necessary to compensate for slight variations in the dimensions and locations of the parts.

From the foregoing it will be apparent that the mechanism described has the advantage that a solid connection between the control stick and the auxiliary airfoil is maintained at all times, the airfoil section which carries said auxiliary airfoil being freely movable to folded and extended positions without possibility of damaging the mechanism regardless of the position of the auxiliary airfoil at such time. Further advantages obtained are that the use of flexible cables in the control system, and the complicated take-up arrangement necessary when such cables are employed, are avoided.

A modified form of swivel is illustrated in Figure 4. In this embodiment, the shank 38 is journaled in a sleeve 39 which is externally threaded so that it may be screwed into a threaded bore in the part which carries the lateral extension 29. The sleeve 39, therefore, may be adjusted to lengthen or shorten the swivel as may be necessary to properly connect the levers 25 and 30, a lock nut 40 being provided to secure the parts against relative axial movement when such adjustment has been made. The modified swivel described has the advantage that it avoids the necessity of adjusting the length of the links 24 and 34 in the manner and for the purpose heretofore described, and hence makes it unnecessary that such links be in the form of turnbuckles.

Although the mechanism is illustrated and described in connection with the control of the ailerons of an airplane, it will be understood, of course, that this is intended by way of example only, as the features of the invention may be availed of to equal advantage for transmitting forces and motions between control and controlled devices designed for various purposes.

We claim as our invention:

1. The combination with cooperating members, one of which is connected to the other for pivotal movement about a predetermined axis, of a pivotally mounted lever carried by one of said members and having a predetermined range of movement, means carried by said last mentioned member for actuating said lever, a pivotally mounted lever carried by the other of said members, means carried by said last mentioned member which is adapted to be actuated by said last mentioned lever, and a swivel connecting said levers, the axis of said swivel being and remaining substantially coincident with said first mentioned axis throughout said range of movement but moving to a substantial extent in an axial direction in moving through said range of movement.

2. The combination with cooperating members, one of which is connected to the other for pivotal movement about a predetermined axis, of a pivotally mounted lever carried by one of said members and having a predetedmined range of movement, an elongated, longitudinally movable element carried by said last mentioned member for actuating said lever, a pivotally mounted lever carried by the other of said members, means carried by said last mentioned member which is adapted to be actuated by said last mentioned lever, and a swivel connecting said levers, the axis of said swivel being and remaining substantially coincident with said first mentioned axis throughout said range of movement but moving to a substantial extent in an axial direction in moving through said range of movement.

3. The combination with cooperating members, one of which is connected to the other for pivotal movement about a predetermined axis, of a lever pivotally supported by one of said members at one side of said axis, said lever having a predetermined range of movement, means carried by said last mentioned member for actuating said lever, a lever pivotally supported by the other of said members at the opposite side of said axis, means carried by said last mentioned member which is adapted to be actuated by said last mentioned lever, said levers having ends which extend angularly toward said axis in spaced relation with respect to one another, and a swivel connecting said levers, the axis of said swivel being and remaining substantially coincident with said first mentioned axis throughout said range of movement but moving to a substantial extent in an axial direction in moving through said range of movement.

4. The combination with cooperating members, one of which is pivotoally connected to the other for pivotal movement about a predetermined axis, of a pivotoally mounted lever, said lever having a predetermined range of movement, a bellcrank, a link connecting said bellcrank and said lever, means for actuating said bellcrank, said lever, bellcrank, link and means being carried by one of said members, a second pivotally mounted lever, a second bellcrank, a second link connecting said second bellcrank and said second lever, means which is adapted to be actuated by said second bellcrank, said second lever, second bellcrank, second link and last mentioned means being carried by the other of said members, and a swivel connecting said levers, the axis of said swivel being and remaining substantially coincident with said first mentioned axis throughout said range of movement but moving to a substantial extent in an axial direction in moving through said range of movement.

5. In a folding airfoil, mechanism for transmitting push-pull forces and motions from one airfoil section to a second airfoil section which is connected to the first mentioned section for pivotal movement about a predetermined axis, said mechanism including a pivotally mounted lever carried by said first mentioned airfoil section and having a predetermined range of movement, means carried by said first mentioned airfoil section for actuating said lever, a pivotally mounted lever carried by said second airfoil section, means carried by said second airfoil section which is adapted to be actuated by said last mentioned lever, and a swivel connecting said levers, the axis of said swivel being and remaining substantially coincident with said first mentioned axis throughout said range of movement but moving to a substantial extent in an axial direction in moving through said range of movement.

6. In a folding airfoil, mechanism for transmitting push-pull forces and motions from one airfoil section to a second airfoil section which is connected to said first mentioned airfoil section for pivotal movement about a predetermined axis, said mechanism including a pivotally mounted lever, said lever having a predetermined range of movement, a bellcrank, a link connecting said bellcrank and lever, means for actuating said bellcrank, said lever, bellcrank, link and means being carried by said first mentioned airfoil section, a second pivotally mounted lever, a second bellcrank, a second link connecting said second bellcrank and said second lever, means which is adapted to be actuated by said second bellcrank, said second lever, second bellcrank, second link and said last mentioned means being carried by said second airfoil section, and a swivel connecting said levers, the axis of said swivel being and remaining substantially coincident with said first mentioned axis throughout said range of movement but moving to a substantial extent in an axial direction in moving through said range of movement.

7. Mechanism for transmitting motion to a control surface on the foldable portion of a folding wing airplane, comprising a first lever mounted on the fixed portion of the airplane wing and so pivoted that one end portion thereof may swing substantially in a plane containing the folding axis of the airplane wing and in a generally axial direction, a second lever mounted on the foldable portion of the airplane wing and so pivoted that one end portion thereof may swing substantially in a plane containing the folding axis of the airplane wing and in a generally axial direction, a swivel connection between said end portions of said first and second levers, said swivel connection lying substantially on said folding axis, means for actuating said first lever, and control surface operating means actuated by said second lever.

8. Mechanism for transmitting motion to a control surface on the foldable portion of a folding wing airplane, comprising a first lever mounted on the fixed portion of the airplane wing and pivoted to swing about an axis lying in a plane substantially normal to the folding axis of the airplane wing, a second lever pivoted to swing about an axis lying in a plane substantially normal to the folding axis of the airplane wing, a swivel connection between said first and second levers, said swivel connection lying substantially on said folding axis, means for actuating said first lever, and control surface operating means actuated by said second lever.

9. Mechanism for transmitting motion to a control surface on the foldable portion of a folding wing airplane, comprising a first lever mounted on the fixed portion of the airplane wing and so pivoted that one end portion thereof may swing substantially in a plane containing the folding axis of the airplane wing and in a generally axial direction, a bellcrank, a link connecting said bellcrank and said first lever, means for actuating said bellcrank, said lever, bellcrank, link and actuating means being carried by the fixed portion of the airplane, a second lever so pivoted that one end portion thereof may swing substantially in a plane containing the folding axis of the airplane wing and in a generally axial direction, a second bellcrank, a second link connecting said second bellcrank, a said second lever, means which is adapted to be actuated by said second bellcrank, said second lever, said second bellcrank, said second link and said actuated means being carried by the foldable portion of the airplane wing, and a swivel connection between said end portions of said first and second levers, said swivel connection lying substantially on said folding axis.

10. Mechanism for transmitting motion to a control surface on the foldable portion of a folding wing airplane, comprising a first lever mounted on the fixed portion of the airplane wing and pivoted to swing about an axis lying in a plane substantially normal to the folding axis of the airplane wing, a bellcrank, a link connecting said bellcrank and said first lever, means for actuating said bellcrank, said lever, bellcrank, link and actuating means being carried by the fixed portion of the airplane wing, a second lever pivoted to swing about an axis lying in a plane substantially normal to the folding axis of the airplane wing, a second bellcrank, a second link connecting said second bellcrank and said second lever, means which is adapted to be actuated by said second bellcrank, said second lever, said second bellcrank, said second link and said actuated means being carried by the foldable portion of the airplane wing, and a swivel connection between said first and second levers, said swivel connection lying substantially on said folding axis.

GALE GRISWOLD.
CHARLES H. CANNON, JR.